US009247723B1

(12) United States Patent
Fisser et al.

(10) Patent No.: US 9,247,723 B1
(45) Date of Patent: Feb. 2, 2016

(54) RIGGING LINE ORGANIZER FOR FLY-BOX

(71) Applicants: Brandon Fisser, Gilbert, AZ (US); Zachary Hampton, Gilbert, AZ (US)

(72) Inventors: Brandon Fisser, Gilbert, AZ (US); Zachary Hampton, Gilbert, AZ (US)

( * ) Notice: Subject to any disclaimer, the term of this patent is extended or adjusted under 35 U.S.C. 154(b) by 336 days.

(21) Appl. No.: 14/062,880

(22) Filed: Oct. 24, 2013

Related U.S. Application Data

(60) Provisional application No. 61/718,636, filed on Oct. 25, 2012.

(51) Int. Cl.
*A01K 97/06* (2006.01)

(52) U.S. Cl.
CPC ...................... *A01K 97/06* (2013.01)

(58) Field of Classification Search
USPC ......................... 43/57.2, 57.1, 54.1
See application file for complete search history.

(56) References Cited

U.S. PATENT DOCUMENTS

| | | | | |
|---|---|---|---|---|
| 335,491 A | * | 2/1886 | Wells ..................... | A01K 97/06 43/57.2 |
| 1,490,370 A | * | 4/1924 | Figley .................... | A01K 97/06 43/57.2 |
| 2,422,870 A | * | 6/1947 | Willis .................... | A01K 97/06 206/315.11 |
| 2,866,295 A | * | 12/1958 | Shanks ................... | A01K 97/06 43/57.2 |
| 3,255,550 A | * | 6/1966 | Della Valle Nearo .. | A01K 97/06 43/57.2 |
| 4,052,810 A | * | 10/1977 | Stevenson ............... | A01K 97/06 43/57.2 |
| 4,528,772 A | | 7/1985 | Schaefers | |
| 4,573,284 A | * | 3/1986 | Hanson ................... | A01K 97/06 43/57.2 |
| 4,691,471 A | * | 9/1987 | Hansen ................... | A01K 97/06 43/57.2 |
| 4,791,752 A | * | 12/1988 | Van Kampen ......... | A01K 97/06 242/129.6 |
| 4,852,293 A | * | 8/1989 | Levine ................... | A01K 97/06 190/110 |
| 4,998,685 A | | 3/1991 | Spencer | |
| 5,154,336 A | | 10/1992 | Ouellet | |
| 5,354,012 A | | 10/1994 | Vincent | |
| 5,386,662 A | * | 2/1995 | Vader ..................... | A01K 97/06 206/315.11 |
| 5,490,624 A | | 2/1996 | Yavitz | |
| 5,806,236 A | | 9/1998 | Lloyd | |
| 5,915,947 A | | 6/1999 | Tomlinson | |
| 6,219,958 B1 | | 4/2001 | Eberts | |
| 6,367,190 B1 | | 4/2002 | Looney et al. | |
| 6,694,667 B2 | | 2/2004 | Davis | |
| 6,694,668 B2 | * | 2/2004 | Barnett, Jr. ............. | A01K 97/06 43/57.1 |
| 8,522,474 B1 | * | 9/2013 | Magnuson ............. | A01K 97/06 43/54.1 |
| 2003/0182845 A1 | | 10/2003 | Pfeffer | |
| 2010/0006691 A1 | | 1/2010 | White | |
| 2011/0017862 A1 | | 1/2011 | Hemkens et al. | |

* cited by examiner

*Primary Examiner* — Christopher P Ellis
(74) *Attorney, Agent, or Firm* — Andrew P. Lahser

(57) ABSTRACT

This includes a system to organizing a fly-box. It can hold a tandem rig with two or more fishhooks using a fishing line-winder to wind the tandem rig while the fishhooks remain attached. Then, it anchors the line-winder and fishhooks to the fly-box, thereby, allowing organization of tandem rigs within the fly-box.

19 Claims, 5 Drawing Sheets

RIGGING LINE ORGANIZER FOR FLY-BOX

BACKGROUND

Applicants are fly fisherman who enjoy fishing with nymph rigs (tandem rigs) and do not enjoy untangling nymph rigs from disorganized fly-boxes.

CROSS REFERENCE TO RELATED APPLICATIONS

The present application is related to prior provisional application Ser. No. 61/718,636, filed Oct. 25, 2012, the contents of which are incorporated herein by this reference and are not admitted to be prior art with respect to the present invention by the mention in this cross-reference section.

OBJECTS AND FEATURES

A primary object and feature of the present invention is to provide a system for organizing assembled, pre-tied rigging lines for fishing, complete with flies, hooks, and fishing line, within a fly-box.

It is a further object and feature of the present invention to provide a simple system for stowing and retrieving pre-tied rigging lines that is lightweight, easy to use, and is compatible with existing fishing equipment.

A further primary object and feature of the present invention is to provide such a system that is safe, efficient, trustworthy, inexpensive and handy. Other objects and features of this invention will become apparent with reference to the following descriptions.

CROSS REFERENCE TO RELATED APPLICATIONS

Not applicable.

SUMMARY

Disclosed is a system to assist fishermen to organize a fly-box while using tandem rigs, for example, by preventing tangling, by providing handy access, by allowing easy retrieval, and by allowing convenient storage.

DETAILED DESCRIPTION

The present Rigging Line Organizer for Fly-Box will now be discussed in detail with regard to the attached drawing figures, which were briefly described above. In the following description, numerous specific details are set forth illustrating the Applicants' best mode for practicing the Rigging Line Organizer for Fly-Box and enabling one of ordinary skill in the art to make and use the Rigging Line Organizer for Fly-Box. It will be obvious, however, to one skilled in the art that the present Rigging Line Organizer for Fly-Box may be practiced without many of these specific details. In other instances, well-known manufacturing methods, mechanical engineering considerations, preferences and best practices for the sport of fly-fishing, and other details have not been described in particular detail in order to avoid unnecessarily obscuring this disclosure.

Figure 1:
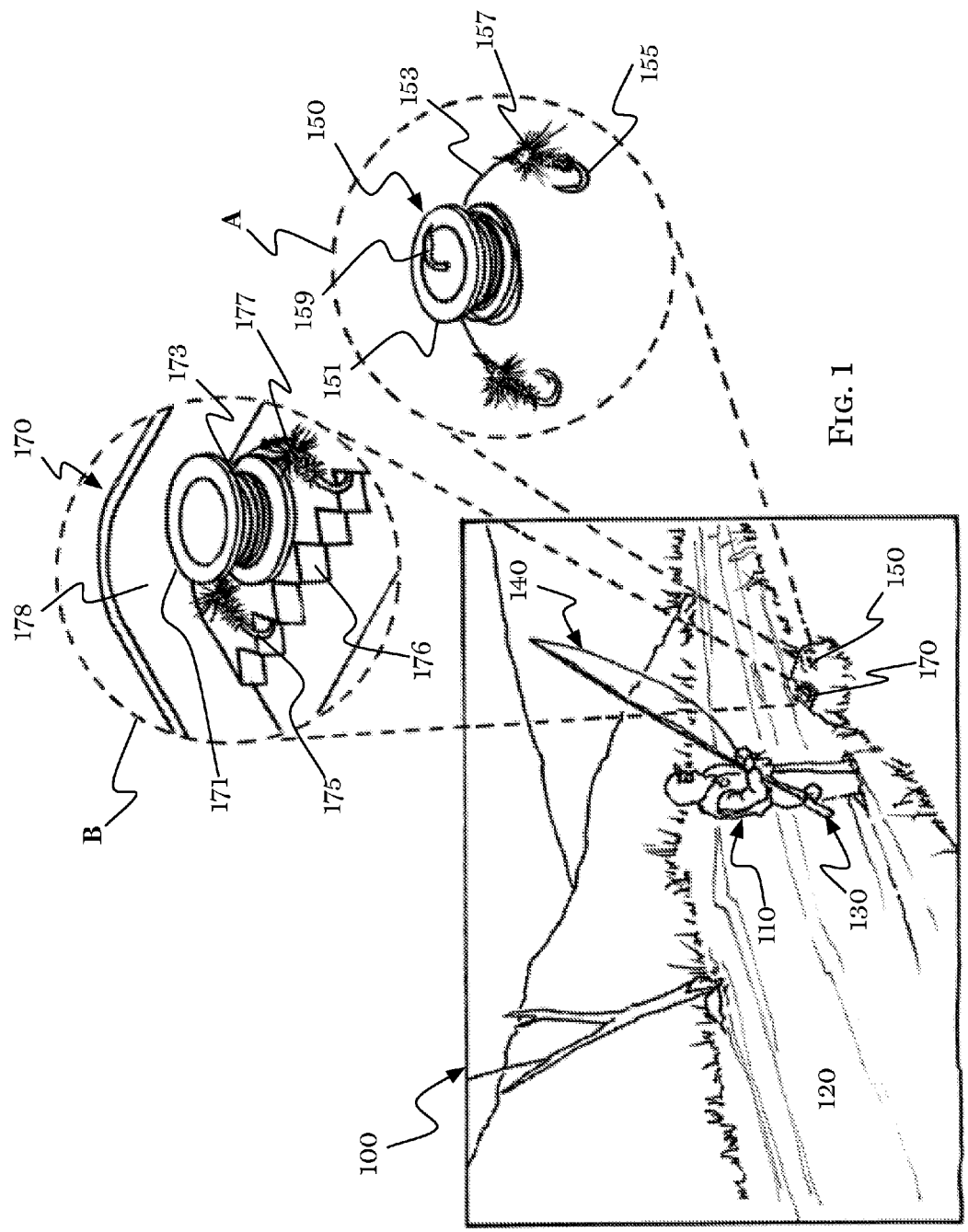
FIG. 1 shows a perspective view that illustrates a fisherman that is fly-fishing in a river while retrieving and stowing tandem rigs.

FIG. 1 shows a perspective view that illustrates scene 100 where fly fishermen 110 is fly-fishing in river 120. Fisherman 110 has prepared to go fly-fishing at river 120. Fisherman 110 has fishing rod 130, as shown. Fishing line 140 usually includes a length of fly line (wound about the rod spool), connected to a tapering leader that is finally connected to a fly. Fly fishermen 110 may prefer a tandem rig (or similar nymph rig, dry-dropper rig, dropper rig, etc.), such as a tandem rig instead of a single fly, when trying to catch a particular fish, or when fishing in a particular area, or when fishing at a particular time of year. For example, fly fisherman 110 may hope to catch a certain kind of fish worthy of a fish story (of course, not shown) so, the fly fisherman 110 may select certain combinations of flies (or nymphs) to use in tandem prior to arriving at river 120. Fly fishermen 110 may prepare tandem rigs 150 and 170 and carry them to river 120 in a fly-box.

Typically, when placing tandem rigs in a fly-box, the tippet fishing line used in the tandem rig may become tangled when stored in the fly-box. Previously, a tandem rig would be simply hooked into the foam (or foam serrations) inside of a fly-box, and, the fly-box would be closed. Stowing and retrieving different sets of tandem rigs from the fly-box would be prone to tangling. Tangling would slow down or frustrate the process of changing rigs and would otherwise frustrate the enjoyment of the fly-fishing trip. When using tandem rigs, fly box organization can be problematic.

Considering exploded portion A, fly fisherman 110, by contrast, has prepared for this fly-fishing trip by winding tandem rig 150 around bobbin 151 with an attached hook 159, as shown. Tandem rig 150 includes a length of tippet fishing line 153, two fishhooks 155, and two flies 157, as shown. Tippet fishing line 153 may be wound around bobbin 151, as shown. After winding, tandem rig 150 may be stowed in a fly-box by hooking hook 159 into the foam teeth of the fly-box, hooking fishhooks 155 on either side of bobbin 151 into the foam teeth of the fly-box, which allows tandem rig 150 to be securely positioned in the fly-box such that tippet 153 will not become entangled with any other tandem rig.

Similarly, tandem rig 170 may be stowed in a fly-box, as shown at exploded portion B. Tandem rig 170 includes tippet fishing line 173, two fishhooks 175, and two flies 177, as shown. Tandem rig 170 may be stowed in fly-box 178, by wrapping fishing line 173 around bobbin 171, as shown. Fly-box 178 includes foam teeth 176, and bobbin 171. In this example, bobbin 171 is permanently attached to fly-box 178, foam 176, or both.

These configurations allow tandem rigs 150 and 170 to be stowed and retrieved from the fly-box with a minimal risk of entanglement with each other, any other tandem rig, or any other flies that are stored in fly-box 178. This solution is simple, handy, and universal. The hook-and-bobbin may attach to any commercially available fly box, whereby, it may provide a solution to tangled fishing line used in tandem rigs.

Further, while preparing for a fly-fishing outing, the system may be used to provide storage for pre-tied combinations of tandem rigs, thereby saving time compared to an unorganized fly box with tangled tandem rigs.

Figure 2:
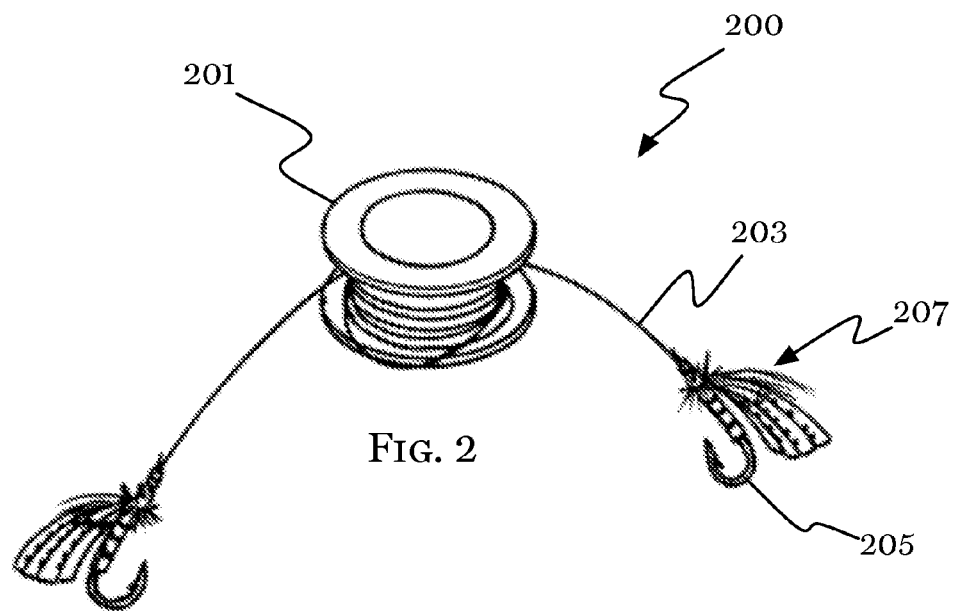
FIG. 2 shows a top perspective view that illustrates a hook-and-bobbin sized to accommodate a single tandem rig with fishing hooks and flies tied to each end of the fishing line.
Figure 3:
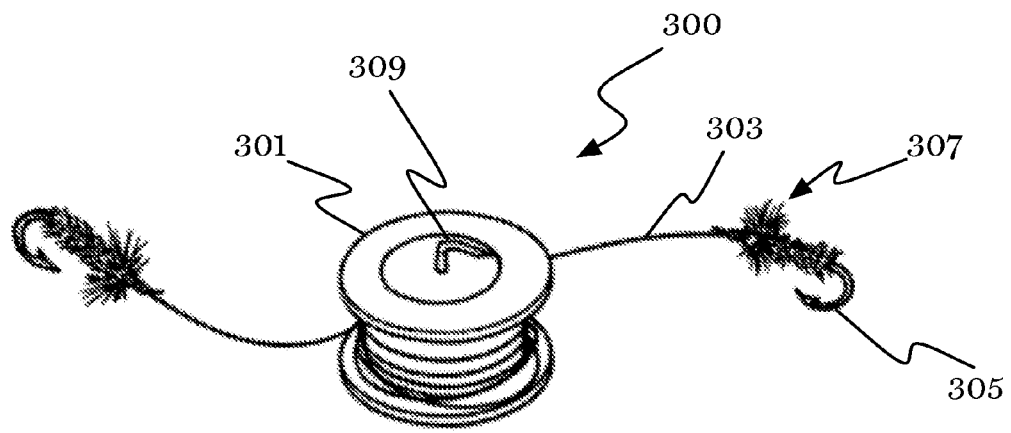
FIG. 3 shows a bottom perspective view that illustrates the hook-and-bobbin with another tandem rig loosely wound about.

FIG. 2 shows a top perspective view that illustrates a hook-and-bobbin sized to accommodate a tandem rig with fishing hooks and flies tied to each end of the fishing line. FIG. 3 shows a bottom perspective view that illustrates the hook-and-bobbin with another tandem rig loosely wound about. Considering FIGS. 2 & 3 together, tandem rigs 200 and 300 may be organized in a fly-box by wrapping around bobbins 201 and 301, respectively, as shown. Next, bobbins 201 and 301 may be anchored into a fly-box using hook 309 (and a similar hook on the back side of bobbin 201 which is not shown) by hooking hook 309 into the foam material that is typically disposed inside fly-boxes to hold and organize flies. This allows bobbin 201 and 301 to lie flat and flush against the foam material used to hold and hook flies in the fly-box. Then, fishhooks 205 and 305 may be hooked on either side of bobbins 201 and 301, similar to how it is shown in portion B of FIG. 1.

The tandem rig may be any suitable multi-fly rig, such as a nymph rig, dual fly rig, dry dropper rig, dropper rig or similar means for removably attaching multiple flies to the end of a fishing line while on a fishing excursion. The fly-box may be any suitable fly storage-container, such as, closable fly-box, single sided foam fly patch, fly wallet, fly-box with pages, magnetic fly box, hard-sided fly box, soft-sided fly box, angler big fly box, hinged fly box, or similar means to contain flies while on a fly-fishing excursion. The fishing line may be any suitable fishing filament, for example, tippet, thread, fiber, monofilament, or similar means to attach a fishhook and to allow fishing by casting the fly.

The tandem rigs shown have both eyelets of the fishhooks tied to the end of the fishing line for simplicity of illustration. In a standard nymph rig, and many other types of multi-fly rigs, it is customary for only the last fly in the rig to be tied to the eyelet. The flies above the last fly are typically tied in the same direction, that is, around the round bend of the fishhook.

Figure 4:
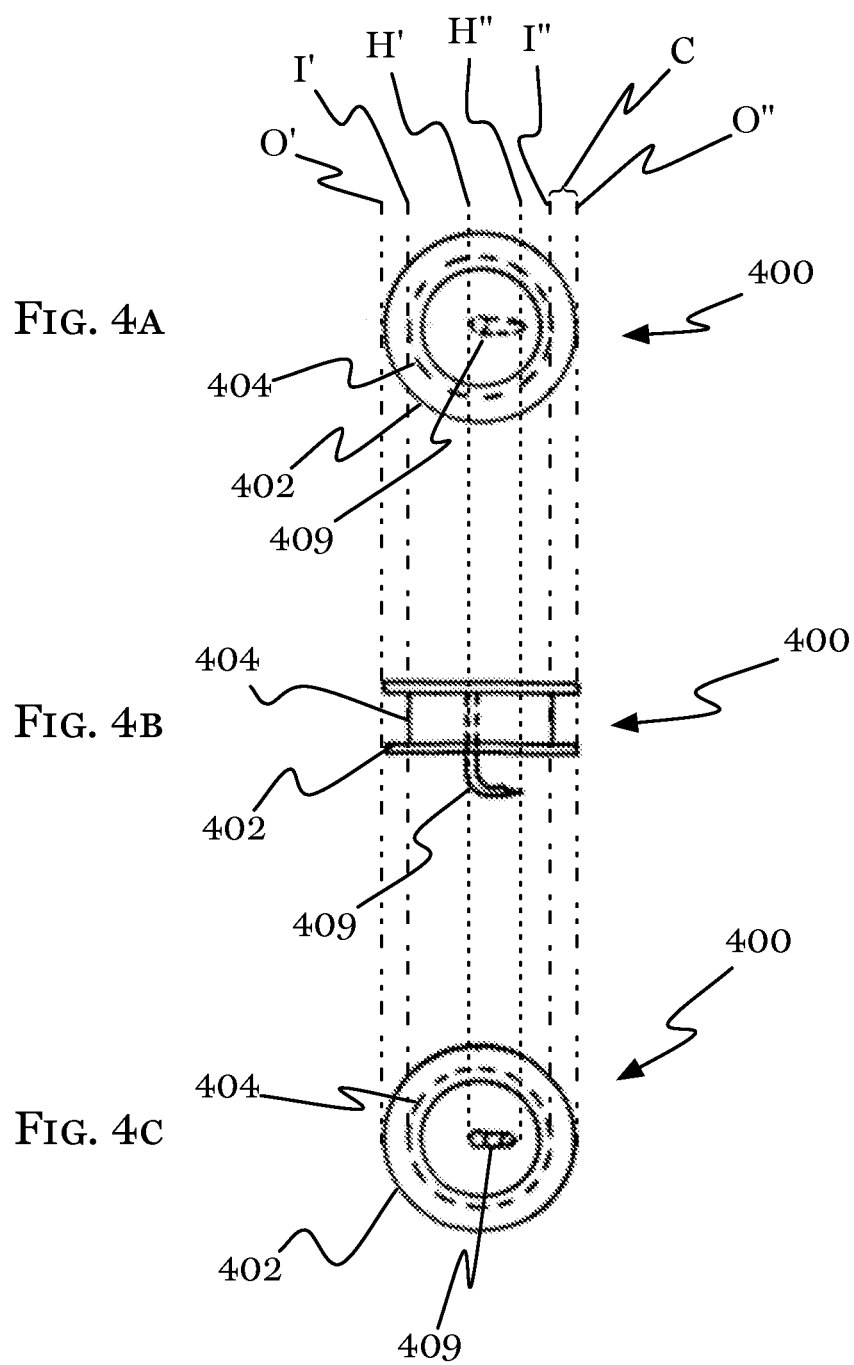
FIG. 4a shows a top view that illustrates the adaptation of the hook, bobbin, and concavity to configure the hook-and-bobbin.
FIG. 4b shows a side view that illustrates the adaptation of the hook, bobbin, and concavity to configure the hook-and-bobbin.
FIG. 4c shows a bottom view that illustrates the adaptation of the hook, bobbin, and concavity to configure the hook-and-bobbin.

FIG. 4a shows a top view that illustrates the adaptation of the hook, bobbin, and concavity to configure the hook-and-bobbin. FIG. 4b shows a side view that illustrates the adaptation of the hook, bobbin, and concavity to configure the hook-and-bobbin. FIG. 4c shows a bottom view that illustrates the adaptation of the hook, bobbin, and concavity to configure the hook-and-bobbin. Considering FIGS. 4a, 4b & 4c together, the arrangement of hook-and-bobbin 400 is selected to accommodate exactly one tandem rig, as shown. Hook-and-bobbin 400 includes two ridges 402, a cylindrical body 404, and a hook 409, as shown.

Cylindrical body 404 includes the width between lines I' and I", as shown. The width of cylindrical body 404 may be selected based on factors, such as, the weight of the fishing line, the length of a tandem rig, and spacing of flies in fly-boxes. This width determines the circumference of cylindrical body 404. Dividing the average length of a tandem rig by the circumference of the cylindrical body 404 provides the approximate number of times a fishermen would need to wind the tandem rig around the cylindrical body in order to stow the tandem rig. In one embodiment of this invention, the diameter of the cylindrical body will be selected to minimize the number of turns required to wind a tandem rig into the stowed position, while, minimizing the space required to store the tandem rig within the fly-box. Also, the profile of the body may be selected to substantially fit within the contour of the fly-holding area of the fly-box. That is, the profile of the body may extend up to the serrated foam teeth, the profile of the body may extend beyond the lower edge, the profile of the body may extend beyond the upper edge. However, the profile would not be sufficiently large to interfere with the storage, stowage or placement of flies or tandem rigs in the adjacent rows.

Ridges 402 include the width between lines O' and O", as shown. The width of ridges 402 may be selected based upon factors such as weight of the fishing line, the length of a tandem rig, and spacing of flies in fly-boxes. In one embodiment of this invention, the diameter of the ridges will be selected to contain the fishing line used in a tandem rig while minimizing the overall size of ridges 402, as shown. That is, the height of ridge 402 may be tall enough to contain the tandem rig while wound around cylindrical body 404, but not so tall to protrude out significantly beyond the tandem rig while would around cylindrical body 404 in the stowed position. The ridges further act to guide the fisherman's hand and the line of the tandem rig when winding the tandem rig around the hook-and-bobbin. The ridges may be any suitable flange, such as, unitary flanges, attached flanges, uniform profile, varying profile, rim, holder, or similar means to allow handy winding of fishing line.

The concavity (that is the depression between the ridges), shown as C, should be selected to be substantially filled after wrapping just one tandem rig around hook-and-bobbin 400, as shown. Said another way, the inner diameter of the cylindrical body 404 may be such less than the outer diameter of ridges 402 so that one tandem rig may wrap around the cylindrical body 404 while being contained by the ridges 402. The concavity may be any concave surface, such as, a depression with a profile resembling a bowl, a depression with a profile resembling a U, a depression with a square profile, hollow, or similar means for containing fishing line while winding. Said yet another way, the concavity may be arranged to minimize slack when the tandem rig is wound about.

The diameter of the ridges 402 may be selected to fit within a predetermined space within a fly box, for example, in a space typically used by 3 to 10 (inclusive) flies. Then, the diameter the cylindrical body 404 may be selected to completely contain one tandem rig while minimizing the number of turns required to completely stow one tandem rig. In some embodiments, the diameter (i.e. width) of the cylindrical body may be similar in size to the shortest portion of the contour or boundary (i.e. length top-to-bottom as a fishhook would be oriented) of the serrated foam fishhook holding area for hooking flies. Said another way, when the hook-and-bobbin is in the anchored position, one edge of the hook-and-bobbin should be near the top of the serrated foam while the other edge of the hook-and-bobbin should be near the bottom of the serrated foam. Cylindrical body 404 and ridges 402 may be made from a variety of materials. For example, metal, hard rubber, or plastic.

Cylindrical body 404 may be a solid mass, for example, by forming using injection molding. Alternately, cylindrical body 404 may be manufactured by a variety of techniques, for example, machining to shape out of metal or alloys. In some embodiments, the ridges and body may be unitary. In further embodiments, the ridges, body and hook may be unitary, for example, if machined out of a single piece of metal. In some embodiments, an anti-abrasion surface may be manufactured or coating may be applied to prevent fishing line abrasion. For example, an anti-abrasive material could be hard rubber. The body may be any suitable line-winder, such as, the cylindrical body, other convenient shapes, other handy shapes, spools, coils, rotators or other means to wind a multi-fly rig while the fishhooks remain attached.

The selection of material may consider such factors as industrial operations considerations, manufacturing techniques, potential abrasion of the fishing line, the ability of the material to avoid abrading the fishing line, economic considerations, and advances in technology.

Hook 409 may extend through cylindrical body 404, as shown. By extending through cylindrical body 404, hook 409 may have additional structural support. After hook 409 protrudes past the side of cylindrical body 404, hook 409 will turn at about a right angle, so that the distal end of hook 409 and the side of cylindrical body 404 may firmly anchor to a fly-box. That is, hook 409 may pierce the foam fishhook holder of the fly-box and allow cylindrical body 404 to slide down flat next to the foam. Said another way, the distal end of the hook and the side of the bobbin should be sufficiently congruous (for example, parallel) to allow hooking and unhooking from the foam in a manner nearly identical to a fishhook. The length of hook 409 that may be substantially parallel or congruous to cylindrical body 404 can be seen between the lines H' and H". This length may be selected to be long enough to firmly engage with the fly-box foam while short enough to not puncture through or beyond the bottom of the fly-box foam. In one embodiment of the invention the, length between H' and H" may not be so long to extend beyond the edge of cylindrical body 402 or beyond the edge of ridges 404.

Hook 409 may be made from a variety of materials. For example, metal, hard rubber, or plastic. The selection of material may consider such factors as, the ability to pierce the foam material used in fly-boxes, durability, convenience, economics, etc. In one embodiment of the invention, metal may be preferred as a hook. In some embodiments, the hook may be near the axis of the bobbin. In other embodiments, the hook may be off-center. The hook may be any type of suitable anchor, such as, a removable fastener, hook-and-loop, safety-pin-like fastener, permanent fastener, chemical bond, holder, or similar means for anchoring the bobbin to the fly-box/serrated foam. The hook and bobbin may be configured and arranged to attach to the fly-box while the side of the bobbin lays flat against (lays flush with) the fly-box, the serrated foam that holds the flies, or both.

Figure 5:
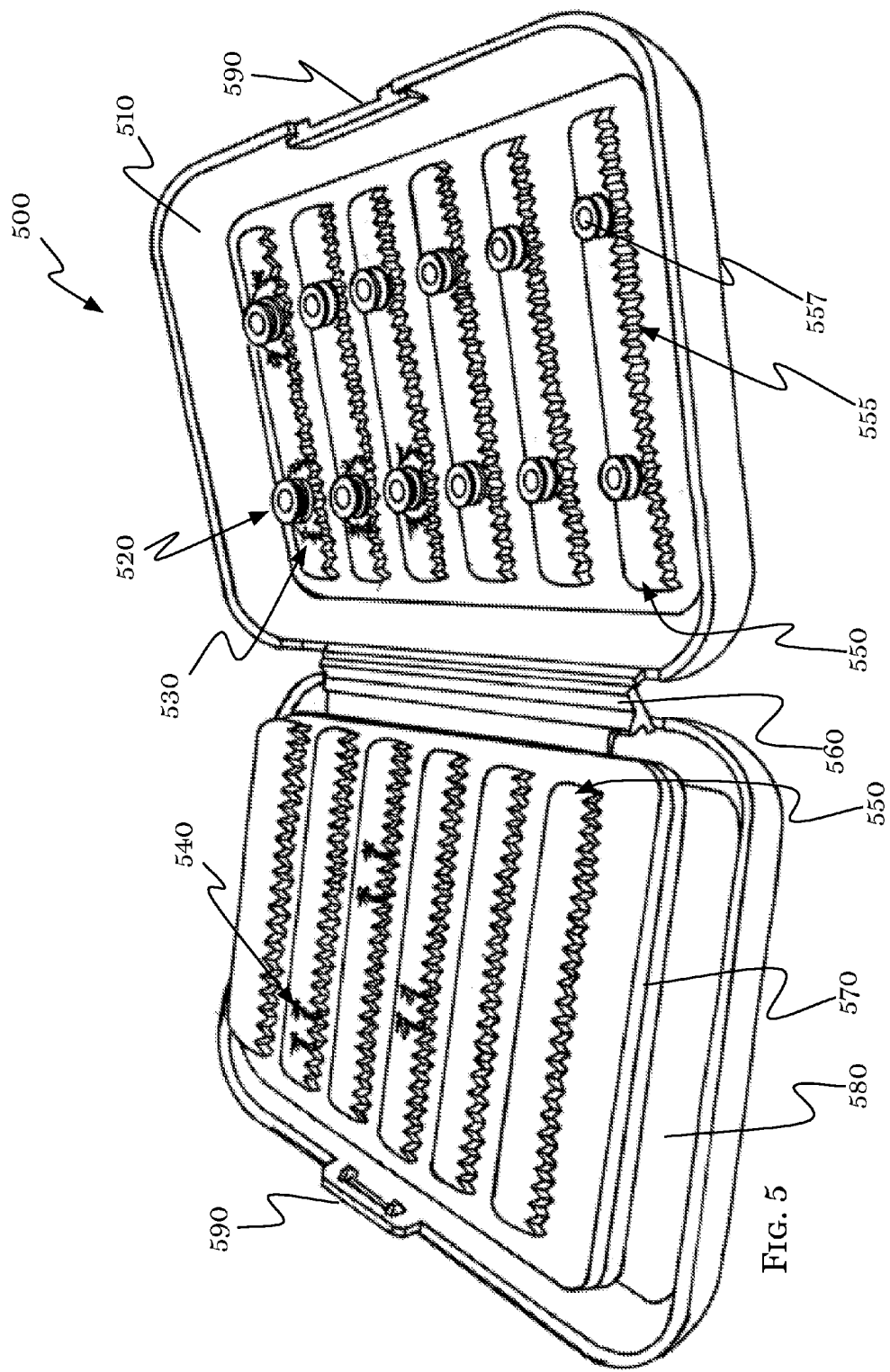
FIG. 5 shows a perspective view that illustrates a fly-box with bobbins; the fly-box has areas dedicated to holding fishing flies and areas dedicated to holding tandem rigs coiled about the bobbins.

FIG. 5 shows a perspective view that illustrates fly-box 500 with bobbins 520, that has areas dedicated to holding fishing flies and areas dedicated to holding tandem rigs coiled about the bobbins. Fly-box 500 includes cover 510, hinge 560, and latch 590, as shown. Inside, fly-box 500 includes back inside cover 515, front inside cover 580, and hinged page 570, as shown. Fly-box 500 may be opened by releasing latch 590 allowing fly-box 500 to open like a book bound at hinge 560, as shown. Similarly, fly-box 500 may be closed by folding together the front and back covers along hinge 560 to allow latch 592 to snap shut, as shown.

Front inside cover 580 and the front and back of hinged page 570 have rows of foam areas 550 with serrated teeth 555, as shown. Foam areas 550 are suitable for hooking flies for storage; for example, flies 540 are shown hooked to foam areas 550 on hinged page 570. Front inside cover 580 and the front and back of hinged page 570 are dedicated to storing fishing flies.

The ratio of the portion of the area of the fly-box that is dedicated to tandem rigs compared to standard flies may be determined by a variety of factors, for example, the type of fishing destination, the size and type of fish to be caught, the kind of flies to imitate, the arrangement of the multi-fly rigs, the season of the fishing excursion, etc. In some embodiments, approximately 5% to 50% of the area would be dedicated to tandem rigs (inclusive). In other embodiments, less than 5% or more than 50% of the area would be dedicated to tandem rigs.

Back inside cover 515, includes a set of bobbins 520, as shown. Tandem rig 530 may be wrapped around the bobbin 520 with the fishhooks hooked into foam areas 550. Back inside cover 510, is dedicated to storing tandem rigs.

Bobbins 520 may be attached to foam area 550. Alternately, bobbins 520 may be attached directly to cover 510 by fastening to foam area 550. Fastening bobbin 520 to cover 510 may provide additional structural support. Also, direct permanent connection between cover 510 and bobbins 520, may provide a better experience for the fisherman winding a tandem rig because bobbin 520 will not wiggle with respect to cover 510. That is, the fisherman would hold cover 510 with one hand, and, wrap tandem rig around bobbin 520 with the other hand; therefore, it may be easier if bobbin 520 does not move or wiggle relative to cover 510 while being held. In some embodiments, the bobbins may lay flat (flush against) the fly box foam.

Foam area 550 may have serrated teeth, as shown. Foam area 550 may comprise closed-cell foam for anchoring and releasing fishhooks and similar hooks. Foam area may be any suitable fishhook holder, such as, closed-cell foam, any lightweight cellular foam, expanded plastic, foamed plastic, pliable rubber, material capable of anchoring/releasing a fishhook, or similar means for anchoring/releasing a fishhook. Fishhook holders may include serrated teeth, slotted teeth, slotted foam, no teeth at all, or a uniform, continuous edge.

Figure 6:
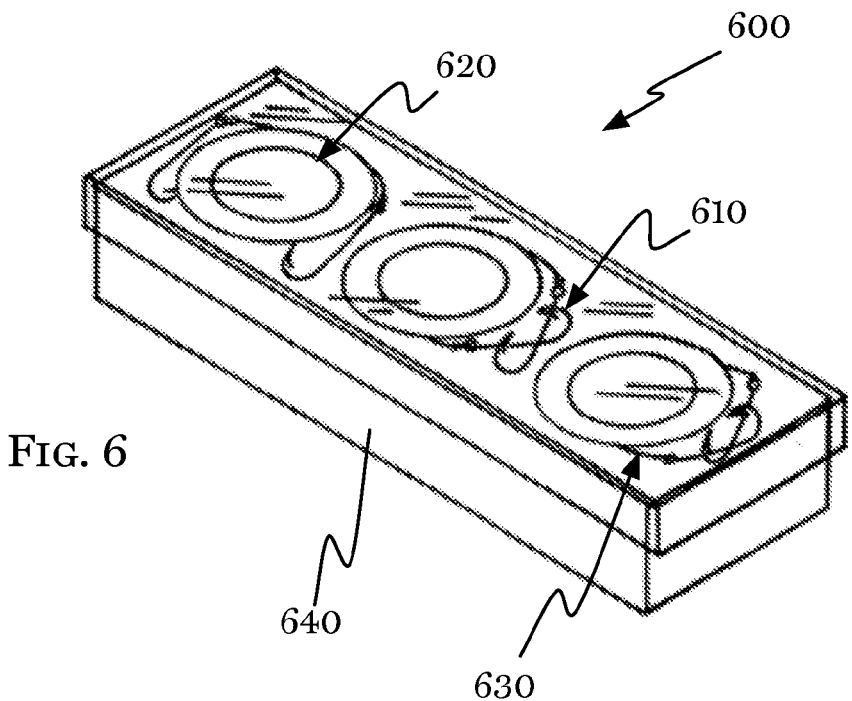
FIG. 6 shows a perspective view that illustrates a kit with a plurality of hook-and-bobbin and pre-tied fly-fishing rigs.

FIG. 6 shows a perspective view that illustrates kit 600 with a plurality of hook-and-bobbin 620 and pre-tied fly-fishing rigs 630. Hook-and-bobbins 620 are similar to those pictured in FIGS. 2, 3, & 4a-c, that is, the bottom side has a hook for anchoring into a fly-fishing box. Pre-tied fly-fishing rigs 630 include a length of fishing line with a pair of hooks 610 tied to either end. Packaging 640 includes a box with a clear cover to hold or to display the plurality of hook-and-bobbin 620 with pre-tied fly-fishing rigs 630. Packaging 640 contains all of these items for usability, display, and convenience.

When sold together, hook-and-bobbins 620 can be created to fit seamlessly with pre-tied fly-fishing rigs 630. The fishing line weight and fishing line length can be selected to fill precisely the concavity of the bobbin. That is, the pre-tied fishing rig 630 may wrap around the hook-and-bobbin 620 such that there is little or no left-over fishing line, and little or no left-over space (slack) to coil the fishing line around the bobbin. Because fishermen may seek different lengths, line weights, and fishhooks, kit 600 may include a variety of complementary sizes. The variety of complementary sizes may be derived consider factors such as the type of rig, the potential fishing destination, the kind of flies to imitate, the season of the fishing excursion, and the size and type of fish to be caught.

The number of hook-and-bobbins 620 may be selected depending upon a variety of factors, including, economic considerations, retailing operations, pricing schemes, and usability factors. For example, the kit 600 may include 2, 3, 4, 5, 6, 7, 8, 9, 10, 11, or 12 mated pairs of hook-and-bobbins 620 and pre-tied fly-fishing rigs 630. Alternately, kit 600 may include more than 12 mated pairs, for example, from 12 to 72 mated pairs, inclusive. Alternately, kit 600 may include a variety of sizes, for example, varying the weight of the line, the length of the line, and the sizes of the hooks.

Figure 7:
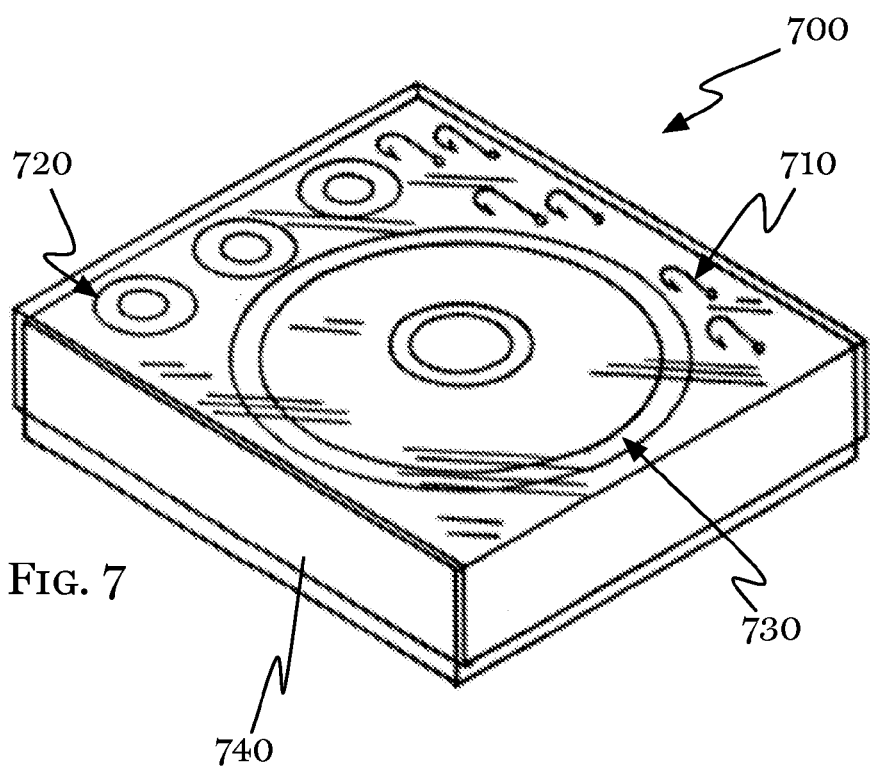
FIG. 7 shows a perspective view that illustrates a kit with a plurality of fishhooks, a supply of fishing line, and a plurality of hook-and-bobbins.

FIG. 7 shows a perspective view that illustrates kit 700 with a plurality of fishhooks 710, a supply of fishing line 730, and a plurality of hook-and-bobbins 720. Packaging 740 contains all of these items for usability, display, and convenience. Kit 700 allows a fisherman to tie multi-fly rigs using the items supplied by kit 700. For example, fishermen may cut a portion of fishing line 730 sized for a tandem rig and tie two fishhooks 710, one at each end. Then, fishermen may tie flies to each of the fishhooks, completing the nymph rig. Finally, fishermen may wrap the completed nymph rig around the hook-and-bobbin 720 and then anchor the hook-and-bobbin and tandem rig's fishhooks into the fisherman's fly-fishing box.

Kit 700 may come with a variety of sizes of fishhooks 710. Kit 700 may come with a variety of sizes of hook-and-bobbins 720. Kit 700 may come with a variety of weights of fishing line 730. Factors for selecting the variety of sizes of fishhooks, hooks-and-bobbins, and weights of fishing line may be determined considering such factors as economic considerations, retail operations, manufacturing considerations, advances in technology, the intended types of fishing rigs, the potential fishing destinations, the kind of flies to imitate, and the size and type of fish to be caught.

Although Applicants have described Applicants' preferred embodiments of this invention, it will be understood that the broadest scope of this invention includes modifications and implementations apparent to those skilled in the art after reading the above specification and the below claims. Such scope is limited only by the below claims as read in connection with the above specification. Further, many other advantages of Applicants' invention will be apparent to those skilled in the art from the above descriptions and the below claims.

What is claimed is:

1. A system, for organizing a fly-box with a fishhook holder capable of holding a multi-fly rig having at least two fishhooks, comprising:
   a bobbin adapted to wind exactly one multi-fly rig while the fishhooks remain attached to the multi-fly rig;
   a hook, connected to the bobbin, to anchor the bobbin to the fly-box;
   wherein the hook and bobbin are configured and arranged to attach to the fly-box with the side of the bobbin flush against the fishhook holder.

2. The system of claim 1 wherein:
   the distal end of the hook and the side of the bobbin are sufficiently congruous to allow the hook and bobbin to hook into a fishhook-holder area on the fly box.

3. The system of claim 1 wherein:
   the bobbin comprises a concavity to contain the exactly one multi-fly rig while winding and when wound about the bobbin;
   wherein the size of the concavity is adapted to minimize slack within the concavity when the exactly one multi-fly rig is wound about the bobbin.

4. The system of claim 1 wherein:
   the bobbin comprises a profile that substantially fits within the contour of a fishhook-holder area on the fly-box.

5. The system of claim 1 wherein:
   the distal end of the hook and the side of the bobbin are sufficiently congruous to allow the hook and bobbin to hook into a fishhook-holder area on the fly box;
   wherein the bobbin comprises a concavity to contain the exactly one multi-fly rig while winding and when wound about the line-winder;
   wherein the size of the concavity is adapted to minimize slack within the concavity when the exactly one multi-fly rig is wound about the line-winder;
   and wherein the bobbin comprises a profile that substantially fits within the contour of a fishhook-holder area on the fly-box.

6. A system, for organizing exactly one multi-fly rig within a fly storage-container, comprising:
   a line-winder adapted to wind the exactly one multi-fly rig while the fishhooks remain attached;
   an anchor connected to the line-winder;
   wherein the line-winder comprises a concavity to contain the exactly one multi-fly rig while wound about the line-winder;
   wherein the size of the concavity is adapted to minimize the slack while the multi-fly rig is wound about the line-winder; wherein the line-winder comprises a bobbin;
   wherein the anchor comprises a hook;
   and wherein the distal end of the hook and the side of the bobbin are sufficiently congruous to allow the hook and bobbin to hook into a fishhook-holder area on the fly storage-container.

7. The system of claim 6 wherein:
   the line-winder comprises a profile that substantially fits within the contour of a fishhook-holder area on the fly storage-container.

8. The system of claim 6 wherein:
   wherein the hook and bobbin are configured and arranged to attach flush against a fishhook holder area of the fly storage-container.

9. The system of claim 8 wherein:
   the bobbin comprises a profile that substantially fits within the contour of a fishhook-holder area on the fly storage-container.

10. A system, to organize a multi-fly rig within a fly storage-container with a fishhook-holder area, comprising:
    a line-winder adapted to wind the multi-fly rig while the fishhooks remain attached;
    an anchor connected to the line-winder;
    wherein the anchor and line-winder have a profile that substantially fits within the contour of a fishhook-holder area; wherein the line-winder comprises a bobbin;
    wherein the anchor comprises a hook;
    and wherein the distal end of the hook and the side of the bobbin are sufficiently congruous to allow the hook and bobbin to hook into a fishhook-holder.

11. The system of claim 10 wherein:
    the line-winder comprises a concavity to contain the multi-fly rig when wound about the line-winder;
    wherein the size of the concavity is adapted to minimize slack within the concavity when the multi-fly rig is wound about the line-winder.

12. The system of claim 10 wherein:
    wherein the hook and bobbin are configured and arranged to attach flush against the fishhook holder area.

13. The system of claim 12 wherein:
    the bobbin comprises a concavity to contain the multi-fly rig while winding and when wound about the bobbin;

wherein the size of the concavity is adapted to minimize slack within the concavity when the multi-fly rig is wound about the bobbin.

14. A kit to organize a fly storage-container comprising:
a plurality of multi-fly rigs, wherein the multi-fly rig comprises a length of fishing filament, wherein the fishing filament includes a fishhook tied to each end;
a plurality of line-winders with anchors;
wherein each line-winder is adapted to wind one of the multi-fly rigs while the fishhooks remain attached;
wherein each line-winder comprises a concavity to contain one of the multi-fly rigs while winding and when wound about;
wherein the concavity is sized to minimize the slack within the concavity while one of the multi-fly rigs is wound about one of the line-winders; wherein the line-winder comprises a bobbin;
wherein the anchor comprises a hook;
and wherein the distal end of the hook and the side of the bobbin are sufficiently congruous to allow the hook and bobbin to hook into a fishhook-holder.

15. The kit of claim 14 wherein:
the line-winder has a profile that substantially fits within the contour of a fishhook-holder area of a fly storage-container.

16. The kit of claim 14 wherein:
the hook and bobbin are configured and arranged to attach to the fly storage-container with the side of the bobbin flush against the fishhook holder area.

17. A kit to organize a plurality of multi-fly rigs in a fly storage-container comprising:
a length of fishing filament sufficient to tie a plurality of multi-fly rigs;
a plurality of fishhooks sufficient to form a plurality of multi-fly rigs;
a plurality of line-winders with anchors,
wherein each line-winder is adapted to wind a single multi-fly rig while the fishhooks remain attached,
wherein each line-winder comprises a concavity to contain the multi-fly rigs while winding;
wherein the size of the concavity is selected to minimize the slack while one of the multi-fly rigs is wound about one of the line-winders; wherein the line-winder comprises a bobbin;
wherein the anchor comprises a hook;
and wherein the distal end of the hook and the side of the bobbin are sufficiently congruous to allow the hook and bobbin to hook into a fishhook-holder.

18. The kit of claim 17 wherein:
the line-winder has a profile that substantially fits within the contour of a fishhook-holder area on the fly storage-container.

19. The kit of claim 17 wherein:
the hook and bobbin are configured and arranged to attach to the fly-box with the side of the bobbin flush against a fishhook holder area of the fly storage-container.

* * * * *